United States Patent

Crane

[15] 3,673,637
[45] July 4, 1972

[54] POULTRY PICKER

[72] Inventor: Edward J. Crane, Ottumwa, Iowa
[73] Assignee: International Agri-Systems, Inc., Ottumwa, Iowa
[22] Filed: March 12, 1970
[21] Appl. No.: 19,075

Related U.S. Application Data

[63] Continuation of Ser. No. 631,989, April 19, 1967, abandoned.

[52] U.S. Cl............................................................17/11.1
[51] Int. Cl.........................................................A22c 21/02
[58] Field of Search.............................................17/11.1, 47

[56] References Cited

UNITED STATES PATENTS

| | | | |
|---|---|---|---|
| 3,477,093 | 11/1969 | Zebarth et al. | 17/11.1 |
| 1,383,347 | 7/1921 | Stallman | 17/14 |
| 2,862,230 | 12/1958 | Corey et al. | 17/11.1 |
| 2,980,456 | 4/1961 | McMullin | 287/58 CT |
| 3,011,810 | 12/1961 | Crowder | 287/58 CT |
| 3,235,904 | 2/1966 | Brown et al. | 17/11.1 |
| 3,277,515 | 10/1966 | Engkjer et al. | 17/11.1 |

Primary Examiner—Lucie H. Laudenslager
Attorney—Price, Heneveld, Huizenga & Cooper

[57] ABSTRACT

A poultry picker having an overhead conveyor from which the poultry to be plucked are adapted to be flexibly suspended and carried through the machine. Positioned to either side of the path of travel of the poultry through the apparatus are a plurality of bullet-shaped, flexible finger supports. Each of the supports are rotatable about axes oriented generally toward the path of travel of the bird. The supports are arranged in upper and lower rows on each side of the machine with non-coinciding axes of rotation permitting sections of the bird to swing laterally after being engaged by the fingers on any particular support.

The individual supports are easily removable for cleaning and finger replacement by means of a depressible knob or button slidably and resiliently retained within the particular support hub. The support slides onto the hub and the knob extends to protrude through a suitable aperture therein. By depressing the knob, the support may be removed easily from the hub. It is understood that this abstract is not to be utilized to limit the scope of this invention.

16 Claims, 8 Drawing Figures

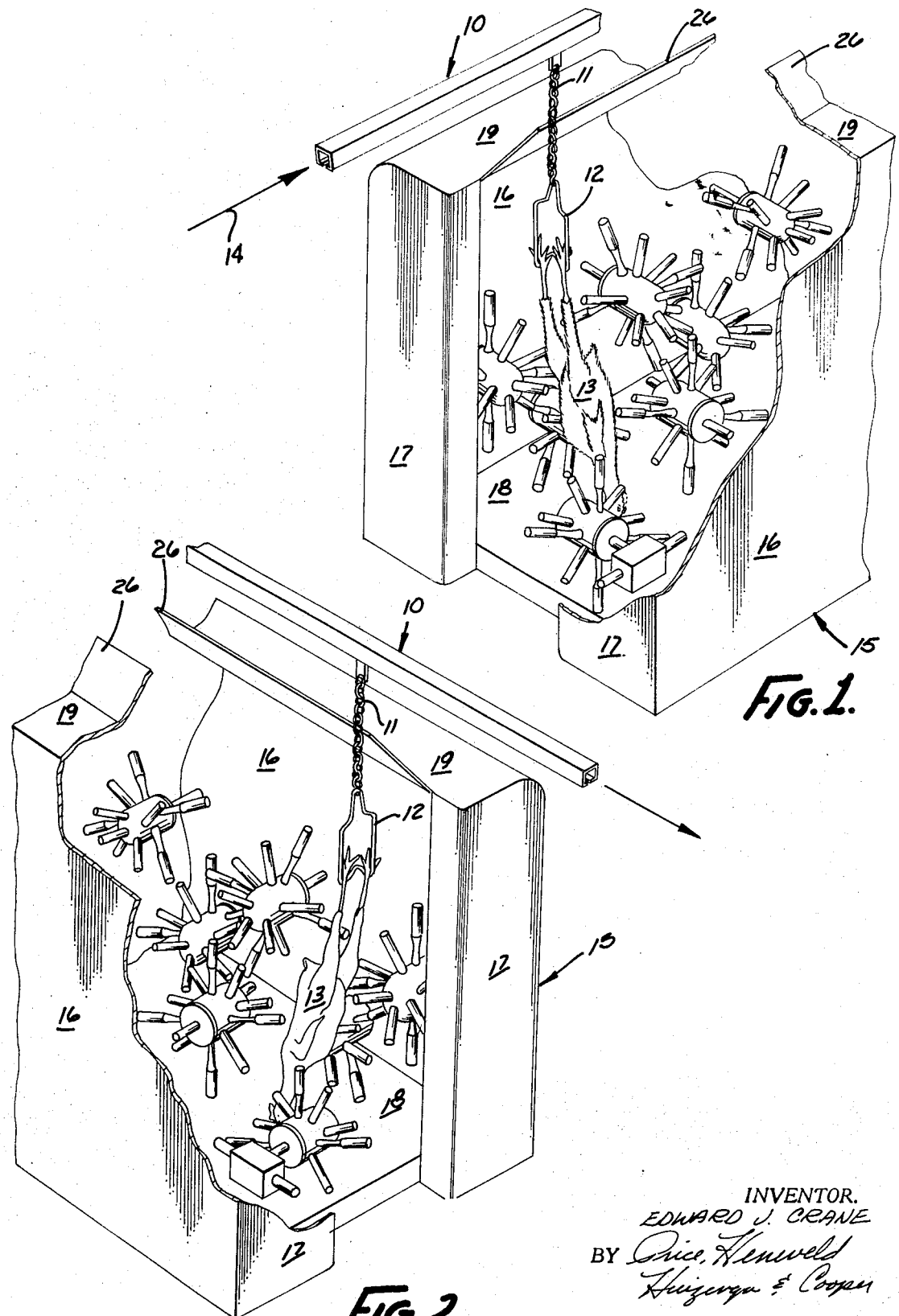

INVENTOR.
EDWARD J. CRANE
BY
ATTORNEYS

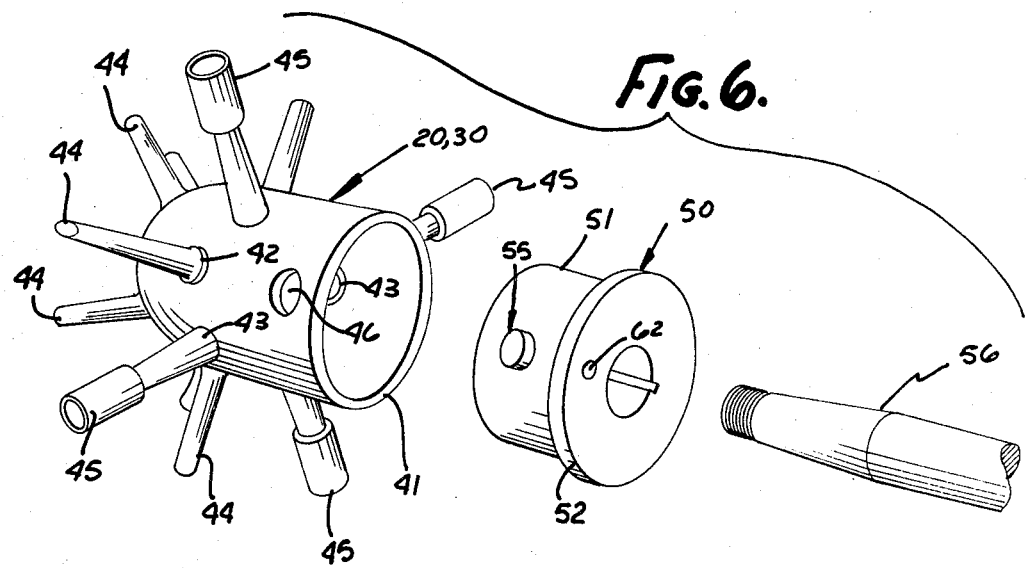
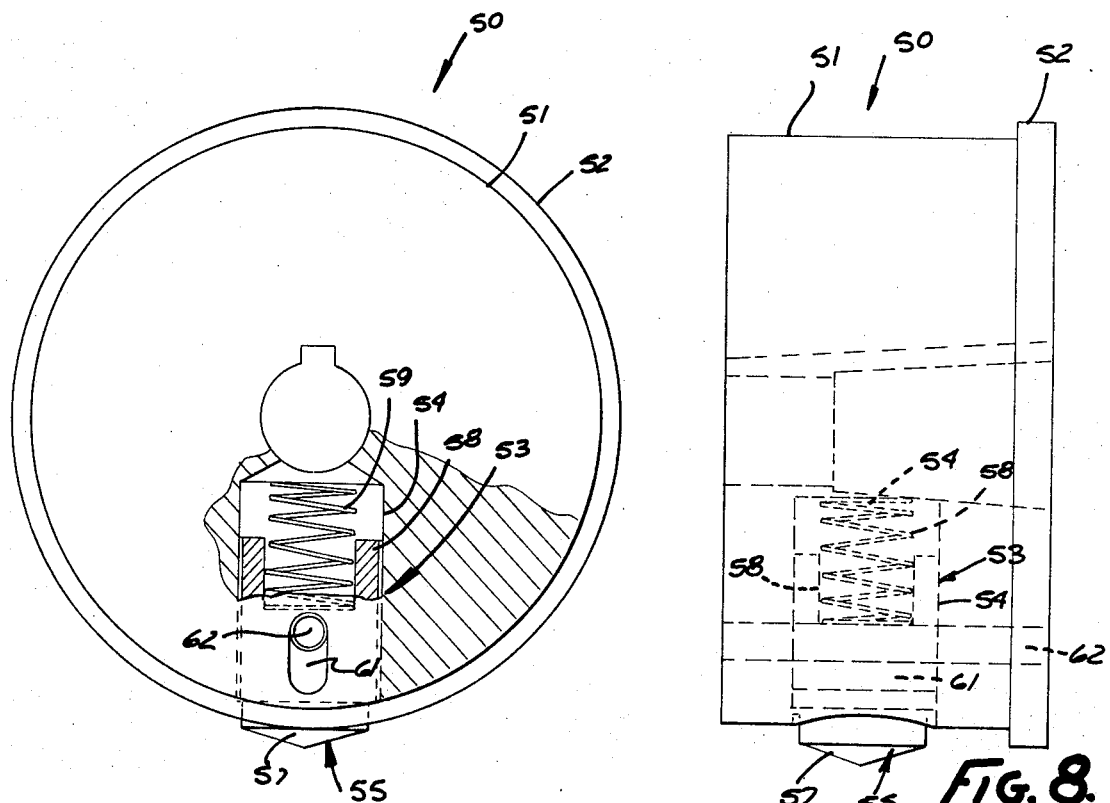

3,673,637

POULTRY PICKER

RELATION TO COPENDING APPLICATIONS

This application is a continuation of my copending application Ser. No. 631,989, filed Apr. 19, 1967, and now abandoned.

BACKGROUND

This invention relates to poultry picking apparatus and, more particularly, to such apparatus wherein the poultry to be picked are continually drawn through the machine by means of an overhead conveyor. Thus, this invention relates to the type of poultry picking apparatus particularly adapted for assembly-line preparation techniques.

Mechanical poultry plucking devices may be divided roughly into two distinct classifications. These are those wherein the bird is carried through the machine by means of an overhead conveyor and those wherein the bird is completely free from external shackling or retention during its passage through the machine. The non-retained systems wherein no overhead conveyor is utilized have the distinct advantage of permitting the birds to tumble freely about within the apparatus in response to the engagement of the wiping-like picking fingers thereagainst. This freedom to tumble and, thus, move out of engagement with the fingers on a particular support, prevents barking, tearing and like mutilation of the bird resulting from excessive pressure exerted thereon by the flexible fingers. This type of machine has the distinct disadvantage, however, of requiring that the birds be removed from the overhead conveyor system within the particular process plant for passage through the picking apparatus, an operational step which must be executed ordinarily by hand. Subsequent to passage of the birds through the machine, they must then be reaffixed to the shackles for further processing.

That class of machines wherein the birds are retained by a conveyor during passage therethrough obviates the necessity and expense of providing labor to individually remove the birds from the overhead conveyor, place them into the picking machine, remove them therefrom and thereafter rehang them from the shackles. With this type of machine, however, the birds have not been free, heretofore, to tumble or otherwise move about within the apparatus and, therefore, are often compressed between the picking supports and subjected to wiping forces from the flexible fingers of sufficient force to bark or otherwise mutilate the poultry, thus rendering them unfit for prime marketing.

In an attempt to avoid the labor problems noted previously, most processors have turned to the type of machine wherein the bird remains on the shackle during passage therethrough, despite the fact that the results are concededly not as good as those obtainable in the non-retained type of machine. The necessity for this choice is obvious when labor costs, procurement, and the highly competitive market are considered. It is these factors which have forced the processor to run the risk of mutilating a certain percentage of the birds processed and, perhaps, packaging some birds which are definitely of substandard condition attributable directly to the impinging forces of the feather-wiping fingers.

OBJECTS AND SPECIFICATION

It is an object of this invention, therefore, to provide a poultry picking apparatus which combines the advantages of the retained and non-retained types of picking assemblies outlined above without incorporating the individual disadvantages thereof.

More particularly, it is an object of this invention to provide a picking machine particularly adapted for utilization in conjunction with a continuous overhead type of conveyor from which the poultry are suspended and, yet, wherein the birds are free to tumble and be deflected when struck by individual wiping fingers to prevent the exertion of excessive forces thereagainst which result in wing breakage, barking or other types of mutilation of the bird.

It is an object of this invention to provide a machine of the type described wherein the path of bird travel is tortious to insure a thorough wiping of the feathers from the bird and, yet, wherein at no time during its travel through the apparatus is the bird restricted into a confined area and struck repeatedly at the same location by the flexible wiping fingers.

Thus, it is an object of this invention to provide an apparatus of the type described capable of quickly and efficiently picking the feathers from the birds as they pass therethrough without subjecting localized areas of the birds to repetitive forces likely to bark or otherwise mutilate them.

It is a further object of this invention to provide a device of the type described embodying novel means for retaining the finger supports within the apparatus, the means permitting the easy and speedy removal thereof for finger replacement, cleaning and the like.

These as well as other objects of this invention will be readily understood with reference to the following specification and accompanying figures in which:

FIG. 1 is a fragmentary perspective view of the novel apparatus showing the bird at the entry end;

FIG. 2 is a fragmentary perspective view of the apparatus illustrating the bird at the exit end;

FIG. 6 is a fragmentary, exploded, perspective view of a typical support, hub and shaft;

FIG. 7 is a side-elevational view, partially in cross section, of the finger support hub; and FIG. 8 is an end-elevational view of the finger support hub.

Figure 3:
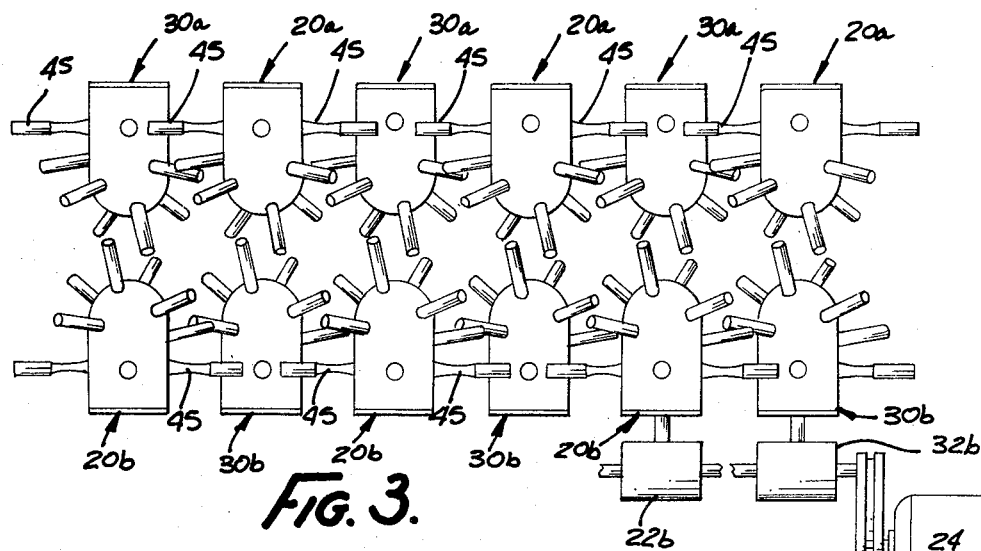
FIG. 3 is a schematic, plan view illustrating the finger support positioning scheme.

Briefly, this invention comprises a poultry plucking apparatus having an overhead conveyor from which poultry are adapted to be suspended, the movement of the conveyor defining a path of poultry travel through the apparatus. A plurality of finger supports are positioned to either side of the path, the supports being rotatably mounted about axes oriented generally toward the path. Flexible picking fingers are affixed to the supports for rotation therewith and at least some of the fingers on each support intersect the path to contact poultry moving therealong. The supports are offset with respect to one another in such a manner that a free area exists on the opposite side of the path from each support whereby poultry sections are free to swing out of contact with the fingers after being wiped thereby.

Referring now to the figures, a preferred embodiment of this invention will be described in detail. Referring initially to FIGS. 1 through 5, the apparatus comprises an overhead conveyor 10 suitably suspended from the ceiling or the like and powered in such a manner that the flexible couplings 11 and shackles 12 connected thereto move through the processing plant in a direction indicated generally by the arrow 14. The bird 13 is suspended from the shackle 12 by the legs in the preferred embodiment of this invention as is well-known in the art.

The picking enclosure, indicated generally by the reference numeral 15, comprises sidewalls 16, partial end walls 17, a floor 18 and a top structure 19. Top structure 19 preferably includes a pair of slanted converging shields 26 which function to restrict the quantity of feathers thrown from the machine by the whirling pickers.

For purposes of clarity, in the following explanation, the picking support assemblies will be divided into four groups. The upper support assemblies on one side of the machine will be designated by the reference numeral 20a and the upper support assemblies on the opposite side of the machine will be designated by the reference numeral 20b. Similarly, the lower support assemblies will be designated by the reference numerals 30a and 30b respectively. The positioning of the support assemblies within the apparatus is such that, as viewed best in FIGS. 3 through 5, the area laterally across from each of the supports is substantially free and, thus, a bird or portions thereof may swing to fill this area after it has been struck by the wiper fingers on any particular support. Thus, as viewed in the figures, the supports 20a and 20b are laterally staggered through the interior of the machine such that a bird passing therethrough (for example, from left to right as viewed in FIG. 4) is contacted initially by the fingers on one of the supports 20b, then by the fingers on one of the supports 20a, again by the fingers on one of the supports 20b, etc. The lower support assemblies 30 are positioned such that the bird, moving from left to right as viewed in FIG. 4, contacts initially the fingers on one of the supports 30a, then the fingers on the support 30b, again the fingers on a support 30a, etc. Additionally, the upper and lower support assemblies are offset, preferably, from one another such that in each longitudinally aligned pair, one of the supports is journalled on the opposite side of the machine from the other of the supports and one support assumes an upper position and the other a lower position. Thus, supports 20b are positioned on opposite sides of the machine from supports 30a vertically spaced therefrom and supports 20a (on the same side of the machine as supports 30a) are positioned on opposite sides of the machine from supports 30b and vertically spaced therefrom.

Stated in a different manner, the supports 20 on either side of the machine are positioned in zig-zag fashion along the length of the path and, similarly, the supports 30 on either side of the machine are positioned in zig-zag fashion along the length of the path. Further, the upper and lower zig-zag arrangements are opposite whereby the space on opposite sides of the path from each support is substantially empty.

In the preferred embodiment, the supports are rotated by means of a series of four longitudinal shafts, 21a, 21b, 31a and 31b. The shafts are rotatably connected to their respective support assemblies by means of conventional right-angle drives 22a, 22b, 32a and 32b, respectively. The shafts 21 and 31 may be driven in the prescribed direction of rotation by means of conventional motors such as that indicated at 24 in FIG. 3. By suitable interconnection, a single motor may be utilized to drive all shafts or, alternatively, four separate motors may be utilized, one of the motors being rotatably connected to each of the shafts.

Figure 4:
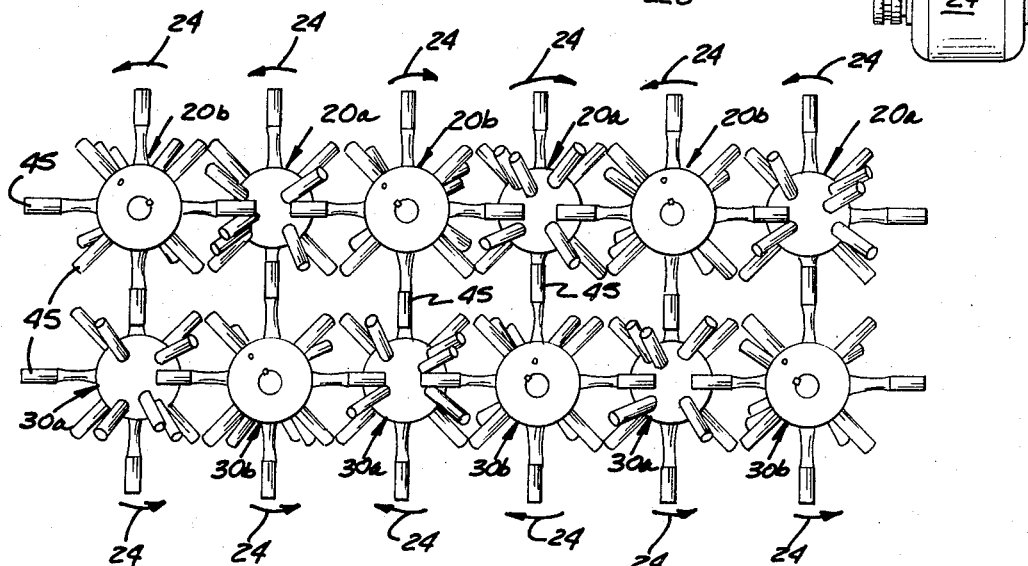
FIG. 4 is a schematic, side-elevational view illustrating the finger support positioning scheme.

As illustrated in FIG. 4, the preferred directions of rotation, indicated generally by the arrows 24, of the various supports are such that (1) adjacent supports in the same row (the rows designated by the reference numeral 20a, 20b, 30a and 30b) rotate in opposite directions; (2) the pairs of longitudinally aligned supports (e.g. pair 30a and 20b, pair 20a and 30b) rotate in identical directions; and, (3) each group of four supports moving, for example, from left to right in FIG. 4 (e.g. supports 20b, 20a, 30a and 30b) rotate in the same direction which is opposite from the direction of rotation of the next succeeding series of four supports designated by like reference numerals. The directional reference, as utilized in this description, assumes that the machine is being viewed from one side and does not discriminate the particular side of the machine on which the support happens to be positioned.

Referring now additionally to FIG. 6, each of the supports 20a, 20b, 30a and 30b comprise a hollow, bullet-shaped support housing 41 having a series of forward finger receiving apertures 42 and a series of rear finger receiving apertures 43 formed therein by suitable drilling or punching techniques. Positioned within the forward finger receiving apertures 42 in conventional fashion are a plurality of forward picking fingers 44. The forward picking fingers 44 cover the nose of the bullet-shaped support housing as well as the forward section of the cylindrical jacket. Positioned within the rear finger receiving apertures 43 are a plurality of rear picking fingers 45 which, preferably, extend radially with respect to the axis of rotation of the supports. The forward picking fingers 44 are of the successively notched wiping type as are well-known in the art. The rear fingers 45 are longer and more flexible in nature and terminate in hollow cylinder-shaped ends having wiping notches positioned thereon. This type of finger is also well-known in the art. The differential finger construction is partially attributable to the desirability of compensating for the increased tangential speed incurred in moving from the forward section of the housing 41 toward the rear section thereof and partly a result of the desirability of forming a moving flexible wall adjacent the interior sidewalls 16 of the machine as will be discussed in more detail hereinafter.

The smoothly curved shape of the noses of bullet-shaped support housings 41 present no sharp corners or edges which might cause barking, wing breakage and the like. Additionally, the smooth curvature facilitates cleaning of the machine, there being no cracks or crevices into which feathers may become lodged.

Referring now additionally to FIGS. 7 and 8, the support housings 41 are removably affixed to their respective shafts 56 by means of a hub assembly indicated generally by the reference numeral 50. The hub assembly 50 is keyed to the shaft 56 in conventional fashion. The hub comprises a cylindrical support housing engaging section 51 having a shoulder portion 52 against which the rear edge of the support housing 41 is adapted to abut when in working position.

The hub assembly 50 has incorporated therein the release and retain assembly indicated generally by the reference numeral 53. The release and retain assembly 53 comprises a radial aperture 54 drilled into the side of the hub into which is slidably positioned a plug 55. Plug 55 has a button or knob section 57 adapted to protrude above the surface of the support engaging section 51 and a hollow cylindrical section 58 adapted to ride within the aperture 54. The plug 55 is biased radially outwardly by means of a conventional compression spring 59.

The plug 55 is retained within the radial aperture 54 at its outermost, support housing-engaging position by means of a slot 61 drilled or otherwise machined through the diameter of the plug and a pin 62 passing through the entire hub assembly. Thus, as will be readily appreciated by those skilled in the art, when the button 57 is radially depressed inwardly, the spring 59 compresses allowing the button 57 to recede into aperture 54 presenting a relatively flush surface about the entire periphery of cylinder support engaging section 51. Freedom for this radial inward movement is provided by the cooperation of slot 61 with pin 62. When, on the other hand, the inward pressure is released, spring 59 expands forcing the entire plug 55 and, thus, the button 57 radially outwardly to the limit permitted by the engagement of pin 62 with the slot 61. In this position, of course, the button section 57 of plug 55 protrudes above the otherwise cylindrical surface of support engaging section 51.

A suitable retaining aperture 46 is provided in the hollow bullet-shaped support housing 41 through which the button section 57 of plug 55 is adapted to protrude when the hub and housing are mated. That is to say, that the interior cylindrical dimensions of the rear section of housing 41 slidably but closely receive the cylinder support engaging section 51 of hub 50 and, when the rear edge of the housing 41 comes into abutment with the shoulder portion 52 of hub 50, the knob or button 57 expands radially outwardly under the influence of spring 59 to protrude through the aperture 46 and, thus, prevent removal of the support shell 41 until the button 57 is again depressed by hand or other suitable means.

The ease with which the individual finger support housings 41 may be removed from the machine will be appreciated when the problems encountered in a working environment of the type under discussion are considered. State and Federal regulations require that the machines be thoroughly cleaned at rather short intervals. Additionally, it is customary to examine the picking fingers daily and to replace any that might be worn or broken off. With the instant system, a complete set of additional support housings 41 may be provided with the machine. During the clean-up period, the support housings which have been in use may be removed from the machine, the interior of the machine cleaned and the other set of support housings placed back on the machine. Operation may then be recommenced immediately. The support housings 41 which have been in use can be taken to the shop or other facility for renovating such that they will be ready for use at the beginning of the next run.

Figure 5:
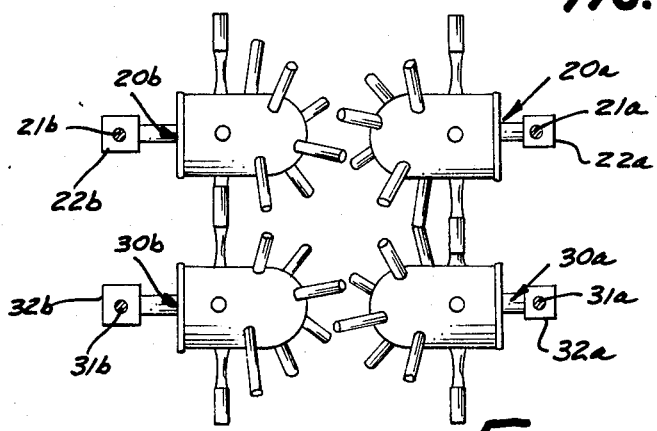
FIG. 5 is a schematic, end-elevational view illustrating the finger support positioning scheme.

From an examination of FIGS. 3 through 5, it will be noted that the rear picking fingers are of such length as to almost intermesh to form rotating walls within those sections of the enclosure opposite a given support housing. Thus, the rear fingers 45 on each of the supports 20b from a wall above each of the supports 30b and across from each of the supports 20a and, similarly, the fingers 45 on each of the supports 30b form a wall below each of the supports 20b and across from each of the supports 30a. Likewise, the fingers 45 on the supports 20a form a rotating wall above each of the supports 30a and the fingers 45 on each of the supports 30a form a rotating wall below each of the supports 20a.

When a bird comes into contact with the forward fingers 44 on one of the supports 20a, portions of it will tend to be thrown toward the opposite wall out of engagement with the fingers. As it approaches the opposite wall, however, it will be struck by the elongated rear fingers 45 on the supports 20b causing it to be tumbled back towards the central path portion through the machine. This process will be repeated between the various supports during the entire passage through the machine.

When the bird comes into contact with two longitudinally aligned, but vertically offset supports such as supports 20b and 30a, the lower head section of the bird is thrown across the machine by contact with the fingers on support 30a and the upper leg and body sections of the bird is thrown toward the opposite side of the machine by contact with the fingers on support 20b. This twisting is relatively unrestricted because of the lateral freedom of space opposite from the forward, path-abutting ends of each of the finger supports and the bird is free to tumble until such time as it is contacted by another picking finger directed so as to force it back toward the center of the path.

Thus, it will be seen that this invention has provided an apparatus wherein the birds being picked are free to tumble or swing under the restraining influence of an overhead shackle utilized not only to carry them through the machine but, additionally, onto the next operating station. The tortious path afforded by the laterally and vertical offset picking supports, coupled with the action of the elongated fingers 45 adjacent the walls of the enclosure, insures that the bird will not become trapped in a restricted area even momentarily and, during such time, slapped or wiped with such force by the fingers as to cause bruising or tearing of the bird.

While a preferred embodiment of this invention has been described in detail, it will be readily apparent to those skilled in the art that other embodiments may be conceived and fabricated without departing from the spirit and scope of this specification and the accompanying drawings. Such other embodiments are to be deemed as included within the scope of the following claims unless these claims, by their language, expressly state otherwise.

The embodiments of the invention in which an exclusive property or privilege is claimed are defined as follows:

What is claimed is:

1. A poultry picking apparatus comprising:
   means for supporting and moving a bird in flexible fashion along a predetermined path;
   a plurality of picking finger supports having flexible picking fingers affixed thereto positioned to either side of said path and adapted to rotate about axes oriented generally toward said path, the axes of rotation of all of said supports and the supports themselves being offset sufficiently with respect to one another along the path of movement of said poultry to prevent injurious compression of said poultry between supports on opposite sides of the path by permitting at least portions of said bird to move between portions of said supports on the same side of said path; and
   means for rotating said supports.

2. The apparatus as set forth in claim 1 wherein at least some of said picking fingers affixed to each of said supports extend into and rotate in said path.

3. The apparatus as set forth in claim 2 wherein at least some of said picking fingers affixed to each of said supports are oriented generally radially to the axis of rotation of the associated support.

4. The apparatus as set forth in claim 3 wherein said supports are arcuately shaped.

5. The apparatus as set forth in claim 1 wherein said supports are positioned in upper and lower rows on either side of said path.

6. The apparatus as set forth in claim 5 wherein the supports in said upper rows are rotatably positioned in zig-zag fashion along the length of said path and wherein the supports in said lower rows are rotatably positioned in zig-zag fashion along the length of said path, the upper and lower zig-zag arrangements being opposite whereby the space on opposite sides of said path from each of said supports is substantially empty.

7. The apparatus as set forth in claim 5 wherein the axis of rotation of each pair of supports, one of which is positioned on one side of said path in an upper or lower row and the other of which is positioned on the other side of said path in the vertically opposite row lie in a common plane perpendicular to said path.

8. The apparatus as set forth in claim 6 wherein said supports are bullet-shaped having a forward rounded nose and a cylindrical body section, the rear of said body section lying adjacent the sidewalls of said apparatus, the rounded nose of said supports lying adjacent said path, said nose having a plurality of first flexible fingers affixed thereto for rotation therewith, said first fingers intersecting said path and a plurality of second flexible fingers affixed to said body section and disposed generally radially to the axis of rotation thereof, said second fingers, when rotated, forming a picking boundary adjacent the interior sidewalls of said apparatus.

9. The apparatus as set forth in claim 5 wherein said rotating means rotates alternate of said supports in each upper row and each lower row in opposite directions.

10. In a poultry plucking apparatus having means for supporting and moving a bird in flexible fashion along a predetermined path, the improvement comprising:
    a plurality of finger supports positioned to either side of said path, said supports being rotatable about axes oriented toward said path and having flexible picking fingers affixed thereto for rotation therewith, at least some of said fingers intersecting said path to contact poultry moving therealong, said supports being laterally offset from one another such that a substantially free space exists on the opposite side of said path from each of said supports whereby at least sections of said poultry are free to swing out of contact with said fingers after being wiped thereby.

11. In a poultry picking apparatus having a plurality of finger supports mounted on a plurality of shafts for rotation therewith, each of said supports having a series of flexible picking fingers mounted thereon for rotation therewith, the improvement comprising: resiliently depressible means affixed to at least one of said shafts and means for receiving said depressible means on at least one of said supports, said depressible means being receivable in said receiving means when said one support is in operative position on said one shaft and being depressible out of said receiving means to permit removal of said one support from said one shaft whereby said one support and the fingers carried thereby can be removed quickly from said one shaft for repair and replacement of the fingers mounted thereon.

12. The improvement as set forth in claim 11 wherein said shaft has a hub affixed thereto with relative permanence, said supports being adapted to telescopically engage said hubs, said depressible means being mounted in said hub and protruding through an aperture in said support when said telescopic engagement is completely effected.

13. In a poultry picking flexible finger support structure adapted to rotate about a predetermined axis, the improvement comprising:

first flexible picking fingers mounted on the outside of said support, said first fingers extending generally radially outwardly with respect to said axis; and second flexible picking fingers mounted on the outside of said support, said second fingers extending non-radially outwardly from said support.

14. The poultry picking flexible finger support structure of claim 13 in which the said second flexible picking fingers include at least some fingers extending from said support at an angle located between said axis and a line perpendicular to said axis.

15. The structure as set forth in claim 13 wherein said support is generally arcuately shaped having a forward rounded nose section and a rear cylindrical body section, said body section being adapted to axially receive a shaft extremity for rotation therewith, said first fingers extending from said body section and said second fingers extending from said nose section.

16. The apparatus as set forth in claim 15 which further comprises resiliently depressible means affixed to said shaft for releasably engaging said support.

* * * * *